United States Patent
Stock et al.

(10) Patent No.: US 9,002,755 B2
(45) Date of Patent: Apr. 7, 2015

(54) SYSTEM AND METHOD FOR CULTURE MAPPING

(71) Applicant: scenarioDNA, New York, NY (US)

(72) Inventors: Timothy J. Stock, New York, NY (US); Marie Lena Stock, New York, NY (US)

(73) Assignee: scenarioDNA, New York, NY (US)

( * ) Notice: Subject to any disclaimer, the term of this patent is extended or adjusted under 35 U.S.C. 154(b) by 0 days.

(21) Appl. No.: 14/173,379

(22) Filed: Feb. 5, 2014

(65) Prior Publication Data

US 2014/0222721 A1   Aug. 7, 2014

Related U.S. Application Data

(60) Provisional application No. 61/760,773, filed on Feb. 5, 2013.

(51) Int. Cl.
| | |
|---|---|
| *G06F 17/00* | (2006.01) |
| *G06N 99/00* | (2010.01) |
| *G06Q 10/00* | (2012.01) |
| *G06Q 50/00* | (2012.01) |
| *G06F 17/30* | (2006.01) |

(52) U.S. Cl.
CPC .............. *G06N 99/005* (2013.01); *G06Q 10/00* (2013.01); *G06Q 50/01* (2013.01); *G06F 17/30716* (2013.01)

(58) Field of Classification Search
None
See application file for complete search history.

(56) References Cited

U.S. PATENT DOCUMENTS

| | | | | |
|---|---|---|---|---|
| 7,458,094 | B2 * | 11/2008 | Jackson | 726/2 |
| 2001/0013009 | A1 * | 8/2001 | Greening et al. | 705/10 |
| 2005/0144158 | A1 * | 6/2005 | Capper et al. | 707/3 |
| 2011/0214086 | A1 * | 9/2011 | Narayanan et al. | 715/784 |
| 2011/0295826 | A1 * | 12/2011 | McLellan | 707/706 |
| 2012/0066026 | A1 * | 3/2012 | Dusig et al. | 705/7.32 |
| 2012/0078704 | A1 * | 3/2012 | Spence, III | 705/14.36 |
| 2013/0067334 | A1 * | 3/2013 | Rose | 715/730 |
| 2014/0068459 | A1 * | 3/2014 | Graham | 715/753 |

OTHER PUBLICATIONS

"Common denominators: what unites global youth?", Tim Stock, Marie Lena Tupot, Young Consumers, vol. 7, Issue 2, 2006, pp. 36-43.*

* cited by examiner

*Primary Examiner* — Kakali Chaki
*Assistant Examiner* — Mai T Tran
(74) *Attorney, Agent, or Firm* — Brooks Kushman P.C.

(57) ABSTRACT

Systems and methods for culture mapping and intelligence include software tools to collect, analyze, and categorize data based on behavior archetypes to produce information visualizations from the data. In one embodiment, a user query relative to a topic of interest may include a word, a combination of words, or a set of words for a particular field, such as a byline or hashtag of an online or networked community. One or more data sources, which may include social media and other websites are selected by the user or the system and a list of accounts ordered by one or more selected criteria, such as frequency of occurrence of the query words, for example, is produced. One or more weighting factors may then be associated with each account. A matrix is generated with accounts positioned to illustrate the account relative to behavior attributes along selected continuums.

18 Claims, 14 Drawing Sheets

| culture | | blogger links | wiki sites | lingo/slang |
|---|---|---|---|---|
| T1-1 | ballet | | | |
| | 1 | http://balletshoesandpointeshoes.blogspot.com/ | http://en.wikipedia.org/wiki/Ballet | turnout |
| | 2 | http://adancersdays.blogspot.com/ | http://www.urbandictionary.com/define.php?term= | port de bras |
| | 3 | http://www.tonyaplank.com/swan_lake_samba_gi | http://thewinger.com/ | Ront de jambe |
| | 4 | http://dancemind.blogspot.com/ | http://dancers.invisionzone.com/index.php | bunhead |
| | 5 | http://thewinger.com/ | http://ballettalk.invisionzone.com/index.php? | pointe |
| | 6 | http://www.fitballet.blogspot.com/ | http://www.dance.net/balletmain.html | pirouette |
| | 7 | http://www.zgalz.com/ | http://www.ballet-dance.com/forum/ | épaulement |
| | 8 | http://penquinshuffle.wordpress.com/ | http://www.pointemagazine.com/ | plie |
| | 9 | http://ballerinahead.wordpress.com/ | http://balletnews.co.uk/ | tendu |
| | 10 | http://leotardsandthebunsinthem.wordpress.com/ | http://jpointe.blogspot.com/ | pas de deux |
| | | http://shortandtothepointe.wordpress.com/ | | |
| | | http://www.tightsandtiaras.com/ | | |
| | | http://roriroars.wordpress.com/ | | |
| | | http://youdancefunny.wordpress.com/ | | |
| | | http://rhymeswithdarling.blogspot.com/ | | |
| T1-2 | trackers | | | |
| | 1 | http://blog.timesunion.com/wildlife/ | http://en.wikipedia.org/wiki/Tracking_(hunting) | wildlife tracking |
| | 2 | http://borntotracknews.blogspot.com/2011/08/sum | http://www.urbandictionary.com/define.php?term= | Camouflage |
| | 3 | http://alcambronne.com/ | http://blog.professionaltrackers.com/courses.php | GPS |
| | 4 | http://www.tovarcerulli.com/ | http://blog.bulletproofcourier.blogspot.com/2010/03/wh | Counter-tracking |
| | 5 | http://norcalcazadora.blogspot.com | http://www.campwildgirls.com/ | Flankers |
| | 6 | http://outdoorswithothmarvohringer.blogspot.com/ | | PLS |
| | 7 | http://www.alphatrilogy.com/ | | survival |
| | 8 | http://skinnymoose.com/hunting-blogs/ | | PAWS principle |
| | 9 | http://enviroethics.blogspot.com/ | | Soundmapping |
| | 10 | http://abnormaloutdoors.blogspot.com/ | | mantracking |
| T1-3 | fraternity br | | | |
| | 1 | http://fratcomm.blogspot.com/ | http://en.wikipedia.org/wiki/Fraternities_and_soror | Fraternity |
| | 2 | http://thefraternityblog.blogspot.com/ | http://www.urbandictionary.com/define.php?term= | Greek |
| | 3 | http://www.blog.webgreek.com/ | | Hazing |
| | 4 | http://aflv.blogspot.com/ | | Initiation |
| | 5 | http://fraternalthoughts.blogspot.com/ | | Panhellenic |
| | 6 | http://www.jessekoch.com/blog/ | | Sorority |
| | 7 | http://fjsullivan.com/blog/ | | Neophyte |
| | 8 | http://purposedrivenreflection.blogspot.com/ | | Fratastrophe |
| | 9 | http://thefraternityadvisor.com/ | | fratdaddy |
| | 10 | http://www.suresister.com/sororityrecreitmentblog/ | | sorostitute |
| T1-4 | crew | | | |
| | 1 | http://www.obeythecoxswain.com/blog/ | http://en.wikipedia.org/wiki/Rowing_(sport) | coxswain |
| | 2 | http://chicagocrewalumni.wordpress.com/ | http://www.urbandictionary.com/define.php?term= | shells |
| | 3 | http://dukerowing.blogspot.com/ | | ergometer |
| | 4 | http://malvernrowing.blogspot.com/ | | glimp seat |
| | 5 | http://trinitywomensrowing.blogspot.com/ | | sculler |

FIG. 12

BALLET
b0red0m.wordpress.com
blogs.wnyc.org/culturist/
danceadvantage.net/directory/links/
danceminute.com/
dancingperfectlyfree.wordpress.com
fullpointe.wordpress.com
optimumhealthchiropractic.wordpress.com
quora.com/an-other
quora.com/angel-leon
quora.com/ben-fisher
quora.com/big-spaceship
quora.com/bradley-horowitz-15740
quora.com/brandy-gill
quora.com/chet-gulland
quora.com/chris-price-1
quora.com/christine-huang
quora.com/christine-tsai
quora.com/chrysanthe-tenentes
quora.com/clayton-mcgratty
quora.com/dan-von-kohorn
quora.com/dave-smith
quora.com/drew-matthews
quora.com/emily-heyward
quora.com/erik-michielsen
quora.com/erin-sparling
quora.com/farrah-bostic
quora.com/gary-whitehill
quora.com/glen-murphy
quora.com/glenn-nano
quora.com/heather-wetzler
quora.com/jack-myers
quora.com/jacob-cohen
quora.com/james-cooper
quora.com/jason-kuperman
quora.com/jason-morrow
quora.com/jason-raznick TRACKERS
126.ta0.at/dodoan/favorites
1nomad.blogspot.com
eatweeds.co.uk/
feeds4all.com.sites.www-catalog.net/windows/2001-2012
firstways.com/
funcfish.com/colleague
hellbillyoutdoors.com/colleague
huntergathercook.typepad.com
maketravelfair.co.uk/friend
marmitelover.blogspot.com
small-scale.net/yearofmud/
starvingofftheland.com/
suburbanbushwacker.blogspot.com
ta0.at/.5ax7h/Twitter
ta0.at/.5axwi/Twitter
thistinyhouse.com/
tovarcerulli.com/blog/
twitter.com/_benwoo
twitter.com/_caseyharn_
twitter.com/_CaseyHarn_/outdoor-pursuits/member
twitter.com/_CaseyHarn_/outdoor-pursuits/subscribers
twitter.com/_CaseyHarn_/real-actual-real-people
twitter.com/_castshot_
twitter.com/_emmabradshaw
twitter.com/_nago_
twitter.com/_NAGO_/hunting-fishing
twitter.com/_theyac_
twitter.com/_treymiller
twitter.com/12gabrowninggal
twitter.com/12manyhobbies
twitter.com/180outdoors
twitter.com/1barbequegalore
twitter.com/1organicgardens
twitter.com/2fishingvideos
twitter.com/2skps
twitter.com/32fishing GREEK LIFE
twitter.com/fratcomm
twitter.com/19baronetbeta90
twitter.com/adrianfrance
twitter.com/aepimidwest
twitter.com/aionational
twitter.com/alancoryapparel
twitter.com/aldon_boston
twitter.com/alexandrasiano
twitter.com/alexlopez30
twitter.com/alexmoulchin
twitter.com/alphaxideltaysu
twitter.com/alumnijunction
twitter.com/alvaldes
twitter.com/atostlawrence
twitter.com/austinarias
twitter.com/bawicomm
twitter.com/bepanhel
twitter.com/bmds99
twitter.com/brandonclarkpdt
twitter.com/brit_e_jean
twitter.com/britthudson
twitter.com/brothergamper
twitter.com/cad1018
twitter.com/camoreno1
twitter.com/campconncc
twitter.com/carekicksrocks
twitter.com/chapterspot
twitter.com/charterday_ball
twitter.com/chesthairmafia
twitter.com/clash216
twitter.com/colinengel
twitter.com/crettich
twitter.com/cshelt00
twitter.com/csloom
twitter.com/customizo
twitter.com/daleo9

FIG. 13

EXAMPLE XML FROM LinkedIn PROFILE QUERY

```
<person>
<id>
<first-name>
<last-name>
<headline>
<location>
<name>
<country>
<code>
</country>
</location>
<industry>
<distance>
<num-recommenders>
<current-status>
<current-status-timestamp>
<connections total="" >
<summary/>
<positions total="">
<position>
<id>
<title>
<summary>
<start-date>
<year>
<month>
</start-date>
<is-current>
<company>
<name>
</company>
</position>
</positions>
<member-url-resources>
<member-url>
<url>
<name>
</member-url>
<api-standard-profile-request>
<url>
<headers>
<http-header>
<name>
<value>
</http-header>
</headers>
</api-standard-profile-request>
<site-standard-profile-request>
<url>
</site-standard-profile-request>
<picture-url>
</person>
```

FIG. 14

EXAMPLE XML FROM FACEBOOK PROFILE QUERY

```
{
"date": [
{
"id": "X999_Y999",
"from": {
"name": "Tom Brady", "id": "X12"
},
"message": "Looking forward to 2010!",
"actions": [
{
"name": "Comment",
"link": "http://www.facebook.com/X999/posts/Y999"
},
{
"name": "Like",
"link": "http://www.facebook.com/X999/posts/Y999"
}
],
"type": "status",
"created_time": "2010-08-02T21:27:44+0000",
"updated_time": "2010-08-02T21:27:44+0000"
},
{
"id": "X998_Y998",
"from": {
"name": "Peyton Manning", "id": "X18"
},
"message": "Where's my contract?",
"actions": [
{
"name": "Comment",
"link": "http://www.facebook.com/X998/posts/Y998"
},
{
"name": "Like",
"link": "http://www.facebook.com/X998/posts/Y998"
}
],
"type": "status",
"created_time": "2010-08-02T21:27:44+0000",
"updated_time": "2010-08-02T21:27:44+0000"
}
]
}
```

FIG. 15

EXAMPLE XML FROM TWITTER PROFILE QUERY

{"results":[
{"text":"@twitterapi http:VVtinyurl.comVctrefg",
"to_user_id":396524,
"to_user":"TwitterAPI",
"from_user":"jkoum",
"metadata":
{
"result_type":"popular",
"recent_retweets": 109
},
"id":1478555574,
"from_user_id":1833773,
"iso_language_code":"nl",
"source":"<a href="http:VVtwitter.comV">twitter<Va>",
"profile_image_url":"http:VVs3.amazonaws.comVtwitter_productionVprofile_imagesV118412707V2522215727_a5f07da155_b_normal.jpg",
"created_at":"Wed, 08 Apr 2009 19:22:10 +0000"},
... truncated ...],
"since_id":0,
"max_id":1480307926,
"refresh_url":"?since_id=1480307926&q=%40twitterapi",
"results_per_page":15,
"next_page":"?page=2&max_id=1480307926&q=%40twitterapi",
"completed_in":0.031704,
"page":1,
"query":"%40twitterapi"}
}

FIG. 16

SYSTEM AND METHOD FOR CULTURE MAPPING

CROSS-REFERENCE TO RELATED APPLICATIONS

This application claims the benefit of U.S. provisional application Ser. No. 61/760,773 filed Feb. 5, 2013, the disclosure of which is hereby incorporated in its entirety by reference herein.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

This disclosure relates to systems and methods for culture mapping based on curating of semiotic data for use in characterizing behavior and/or sentiment of archetypical groups.

BACKGROUND

Various strategies have been used over the years to identify target markets for consumer goods and services. Product planning, development, manufacturing, and distribution often require significant investments of time and resources to provide a successful new product. Miscues may seriously impact a company's financial performance and could even lead to the demise of the company, or allow competitors to capitalize on a misinterpretation of market demand. Similarly, companies are continually seeking new consumers for their goods and services by improving market penetration in existing markets and/or expanding to new market sectors or geographic areas. Successful companies typically gather and attempt to analyze tremendous quantities of consumer data from diverse sources to try to understand the behavior of a target market or segment for an existing or yet-to-be developed product or service.

The ubiquity of personal communication devices, such as cell phones and the internet have led to rapidly emerging and evolving market dynamics that are often well ahead of the ability of a company to recognize the changes and adapt accordingly. Conventional strategies for market data gathering and analysis are limited in their ability to identify and collect relevant data, and to analyze and present the data in a manner that is easily understood by business decision makers.

SUMMARY

Systems and methods for culture mapping according to various embodiments of the present disclosure use semiotic analysis to reveal patterns of functional signs and connect consumer sentiment and/or behavioral actions to these signs. In one embodiment, semiotic analysis informs data collection from social media, including but not limited to social networking websites. Data may include pictures, videos, and text related to a particular query topic, such as a product or activity, for example. The data is processed or analyzed to reveal patterns of functional signs and connect behavioral actions and/or sentiments to these signs. The data may be displayed or visualized in a cultural map or consumer segmentation map.

In one embodiment, the data are arranged, organized, or plotted in a matrix based on functional archetypes. Representative archetypes may be assigned labels based on position within the matrix to convey a generalized behavior of the members of a particular archetype with quadrants separated by axes representing vertical and horizontal continuums. A code may be assigned to each member to facilitate tracking over time and to detect migration of the topic through the matrix.

Various embodiments include software tools to collect and analyze the data, and to produce an information visualization from the data. In one embodiment, the software tool accepts a user query relative to a topic of interest. The user query may include a word, a combination of words, or a set of words for a particular field, such as a byline or hashtag. One or more data sources are selected by the user or the system. The data sources may include social media websites or other websites designated by the user or selected by the system. The system then produces a list of accounts ordered by one or more selected criteria, such as frequency of occurrence of the query words, for example. A weighting factor may then be associated with each account, either manually by the user, or automatically by the system. Accounts can accumulate multiple weights from multiple queries. The multiple weights may be combined using an average or similar mathematical operation. The system then generates a matrix or grid with each account positioned or plotted according to its weight.

Embodiments according to the present disclosure provide various advantages. For example, rather than analyzing and organizing data by numbers and frequency of occurrence, which represents the loudest or most prevalent signals in the data associated with a particular behavior, embodiments according to the present disclosure curate data by personality archetypes or cultures and subcultures within a sample population. The present disclosure provides a semiotic insight tool to curate and visualize cultural data across social media to capture or characterize the flow or kinetics of unstructured expression. Data categorization and visualization using a two-dimensional quadrant reveals insights based on a behavior archetype using the signals in the data to identify codes that can be used to predict behavior. Tracking over a period of time can be used to present two-dimensional or three-dimensional visualizations that show migration of a particular member within the matrix of archetypes. Various embodiments provide new insights into behavior by organizing and filtering members of a monitored population into likeminded groupings and tracking migration, patterns of visual cues in collected imagery, and dimensions associated with the context of monitored words, phrases, and images.

BRIEF DESCRIPTION OF THE DRAWINGS

FIG. 12 is a table illustrating URLs used to curate data and populate the matrix in the embodiment of FIG. 11;

FIG. 13 is a table illustrating user accounts associated with the URLs of FIG. 12 for generating unstructured data used in populating the matrix in the embodiment of FIG. 11; and FIGS. 14-16 illustrate representative XML data returned from representative websites in response to a data mining query in a system or method for culture mapping and intelligence according to embodiments of the present disclosure.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
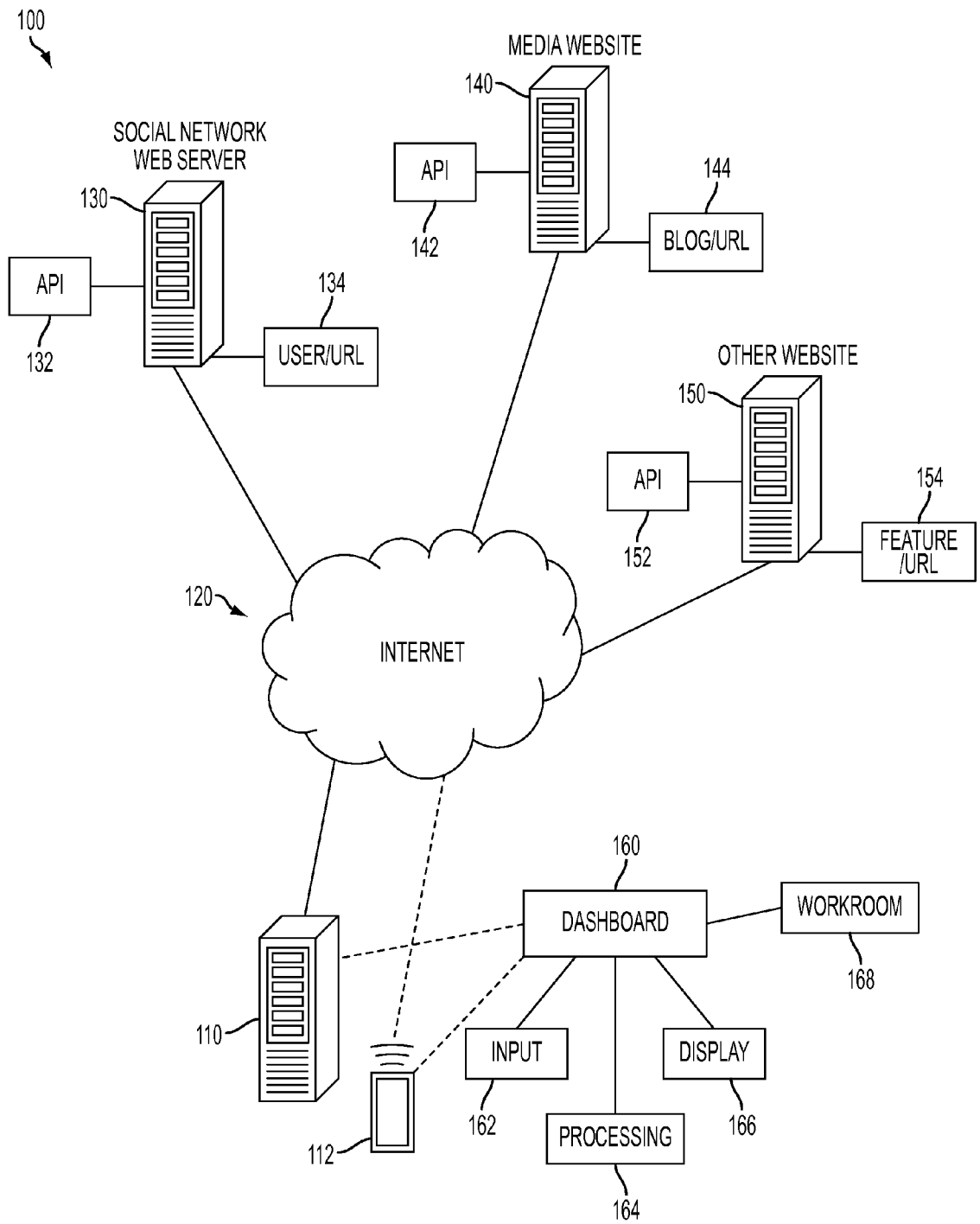
FIG. 1 is a block diagram illustrating operation of one embodiment of a system or method for culture mapping and intelligence according to the present disclosure.

FIG. 1 is a block diagram illustrating operation of one embodiment of a system or method for culture mapping and intelligence according to the present disclosure. System 100 includes a microprocessor-based device such as a desktop, laptop, or server computer 110 in communication with a local and/or wide area network as represented by the internet 120. System 100 may also include one or more mobile devices 112 having wired or wireless connections to the internet or cloud 120. Various other servers and websites may be connected to the local or wide area network 120. In the representative embodiment illustrated in FIG. 1, a social networking website/server 130 is connected to internet 120 and includes an associate application programming interface (API) 132. Social networking website 130 includes a plurality of users having associated accounts as generally represented by user URL 134. Various types of user profile data associated with a user account or URL 134 may be accessed using features of API 132. Other servers or websites may also be connected to the internet 120. Representative servers or websites may include a media website 140 that may be associated with a local or national news organization, web portal, or the like and may include various features or sections with user/visitor comments, blogs, articles, reports, etc. with associated addresses or URLs as generally represented by blog/URL 144. Website 140 may include one or more APIs 142 that may be used to query or mine data from website 140. Similarly, other websites as generally represented at 150 may include one or more associated APIs 152 and features with an associated address or URL 154.

Those of ordinary skill in the art will recognize that any block diagrams or flow charts of the present disclosure generally illustrate operation of a system or method for cultural mapping and include various steps, functions, systems, or subsystems. While some functions or steps may be illustrated or described in a linear or sequential order, the particular order or sequence illustrated is not necessarily required for the system or method to achieve the stated objectives. Various functions or steps may be repeated, may be omitted, or may be performed in a different order or sequence that illustrated depending on the particular application and implementation.

Various embodiments are implemented as a thick client that runs on a laptop or desktop computer 110 or microprocessor-based device having similar resources, while other embodiments are implemented as a thin or stateless client on a device with more limited resources, such as a mobile device 112, that may communicate via a wired or wireless network with one or more servers.

A system or method for culture mapping and intelligence according to one embodiment includes a dashboard application or app 160 implemented primarily in software. Dashboard 160 includes a user interface to facilitate data input 162 or mining from users as stored on one or more servers or websites connected to network or internet 120, such as servers or websites 130, 140, and 150, for example. The input module or function of dashboard 160 may include various menus and forms to facilitate formation of queries related to a particular topic or phrase. Input module or function 162 may also be used to identify or select one or more websites and/or user accounts for data mining and monitoring over time as explained in greater detail herein. For example, in one embodiment, dashboard 160 may be used to select or specify user accounts on social networking websites such as Twitter, LinkedIn, or Facebook. A URL associated with each user account may be stored in a database or table accessible by device 110 or 112 hosting dashboard app 160 for monitoring of a selected topic and its context over time. The URLs may be used to download or collect data available for a particular user using a standard data interchange format, such as JavaScript Object Notation (JSON), for example.

The input module 162 of the dashboard application may also be used to generate or form queries via drop down menu and input fields, for example. The queries may be formatted in one or more standard formats derived from one or more input forms and may be customized for particular types of accounts. For example, in one embodiment, the query forms are used to generate structured query language (SQL) queries based on the particular types of accounts selected, the fields of data provided for those accounts, and the keywords that can be entered to query against those accounts. The input form and/or related processes will generate one or more SQL queries to run against the data collected on the user accounts. In one embodiment, a user interface control, such as a button allows for a popup list to display all queries run so far.

Each account selected by a query may be assigned a weight. Because one of the end visualizations in various embodiments is a two-dimensional grid or matrix, each weighting factor or function may include two numbers that can be either positive or negative and represented as a vertical value and horizontal value in the grid or matrix. For example, a set that is positive, negative (such as 47/−12) may be displayed in the top, left-hand corner of the grid. A set that is negative, positive (such as −99/87) may be displayed in the bottom, right-hand corner of the grid. Multiple weights may be combined using various mathematical or statistical functions to produce a combined or final weight for each account. In one embodiment, the user interface includes a "final processing" button that averages the weights for each account that is used by display function 166 to plot all accounts on a graph. Input system 162 may also provide various fields to document who is using the system, for what client or program, and at what time. Data entered in all of these forms may be input validated before submission can be accepted.

As also illustrated in FIG. 1, dashboard 160 may include a processing component or module 164. This component collects data and downloads the accounts via the internet 120 and associated APIs 132, 142, 152 of websites 130, 140, and 150 provided by the input system 162. Processing module 164 stores the collected data in a database and runs the queries and tracks the weighting for each result for each account as determined by the input module 162. Each monitored account scores a value set for each query that it fits and for which it is assigned a value by the dashboard user, or automatically by the system. In the end of the process, those values are averaged to produce the account's position within the matrix or grid.

Dashboard 160 may also include a display or visualization module or component 166. This component takes the weighting for each account and displays them in a grid or matrix as illustrated and described in greater detail herein. In one embodiment, hovering over any particular point displayed in the grid or matrix brings up a summary from each account associated with the data point as well as a hyperlink to that account. Workroom module or function (FIG. 9) may provide various tools for working with the data. For example, a file capture or archiving function may be provided for storing the queries, process data, and raw results to a file, such as a flat text file, for example. Tools may be provided to annotate data, queries, etc. or to compare and contrast multiple graphs, for example.

The user interface provided by dashboard 160 may include various tools or features accessed by associated drop down menus or by selecting or hovering over a data point. In one embodiment, the user interface provides popup account summaries showing each field for the account (such as Twitter, Facebook, or LinkedIn, for example) as well as dynamic links to any link in any of the fields (for images, etc.). Popup account lists sorted by number of hits for that query may also be provided. Each popup list may include a one line identifier of the account (such as the account "name") in addition to the field that the query selected and an entry field to enter the assigned value. Clicking the identifier produces the popup account summary. The user interface may also provide a popup list of all queries processed, with the option to copy (and modify) or delete any of the queries, for example. A popup word cloud for a quadrant of the matrix or grid may be displayed by clicking on an icon on the corner of each quadrant of the grid. The word clouds may be generated from all the words in all the queries used to assign weighting.

Additional user interface features of dashboard 160 may include a popup thumbnail list of images associated with each account in a particular quadrant of the matrix or grid, produced by clicking on an icon on the corner of each quadrant of the grid; a dynamic grid graph showing all the accounts positioned according to their scoring by query, which may also be exported or downloaded as an .xls or .png file, for example. In one embodiment, dashboard 160 may include tools or options to display various information associated with processing module 164, such as data on time to process, number of accounts processed, complete list of weighted results for each account as well as all the queries executed and their raw results, which may be exportable as a downloadable .csv file, for example. This output file may be provided as a downloadable link accompanying each graph output, and can be used to re-input the entire case. i.e., by saving this file, the user can later upload the file's contents to run the same queries against the same accounts, producing a historic comparison of the same examination. This information may be used to generate a two-dimensional or three-dimensional representation of the matrix or grid over time to illustrate migration of a particular account within the matrix or grid as illustrated and described in greater detail herein.

In one embodiment, the dashboard application or app 160 is implemented primarily in software and may rely on commercially available or open source components or libraries to perform various functions. For example, input function or module 162 may include features and/or code of RedQueryBuilder for the query generator, which is implemented in pure JavaScript. This provides reduced processing load on the server side, easy application integration (including non-GWT integration support with event handlers and JavaScript object configuration), and easy customization. In addition, this tool or a similar tool may be used with simple metadata (JavaScript/JSON or Google Web Toolkit (GWT) interfaces) and supports loading existing SQL queries (within limits of the user interface). Various other open-source solutions may be integrated into dashboard 160 so that the code is exportable and extensible. In one embodiment, the platform consists of a Java application that runs customized code to produce an information visualization from a data set gathered, cleaned, and normalized by a third party.

Those of ordinary skill in the art will recognize that the user interface and features of dashboard 160 may vary depending on the particular implementation. While the user interface may be used to simplify query generation, this may result in compromises on what can be extracted from the data as it may only accept binary, positive results, and may be designed under SQL query language constraints. Of course, the dashboard may include features, such as a command line, for more sophisticated users to bypass more basic input forms and menus to provide additional functionality. While flexible to query, the categories of data imported into the database may limit the data that can be queried in some applications.

While the representative embodiment described above may display the number of hits per query, the account summary data, and any images associated with the account, various other data may also be displayed depending on the particular application and implementation. Similarly, while some embodiments average each account's values to produce the account's position on the matrix or grid, more complex weighting mechanisms or functions may also be used in some applications so that the results are not over simplified.

The behavioral matrices represented in FIGS. 2-6 plot behavioral networks and pattern ongoing relationships of the users represented by the curated data.

Figure 2:
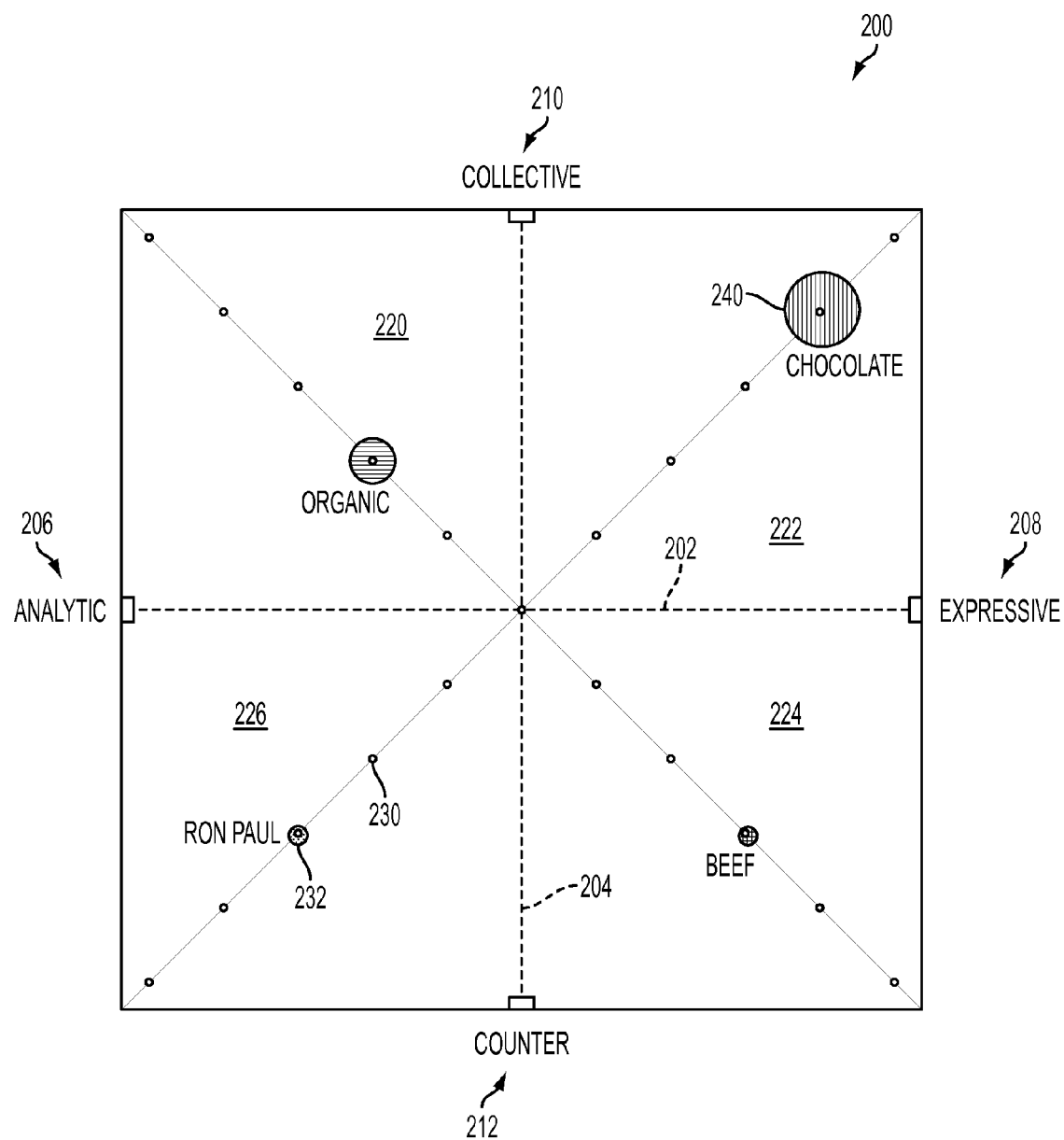
FIG. 2 illustrates a grid or matrix for curating and visualizing data in a system or method for culture mapping and intelligence according to embodiments of the present disclosure.

FIG. 2 illustrates a representative two-dimensional display or grid for visualization of curated data according to one embodiment of a system or method for culture mapping and intelligence of the present disclosure. Grid or matrix 200 includes a horizontal axis 202 representing a continuum of a particular characteristic or category of behavior, which ranges from analytic 206 to expressive 208 in this example.

Vertical axis 204 represents a continuum of a second characteristic, which ranges from collective 210 to counter 212 in this example. Data 230 is arranged or plotted on the grid 200 in quadrants 220, 222, 224, and 226 as previously described to identify various archetypes or models of behavior based on unstructured use by identified user accounts of a particular word or phrase. Data may be plotted by number of occurrences with larger data point 240 indicating more occurrences than smaller data point 232, for example.

Figure 3:
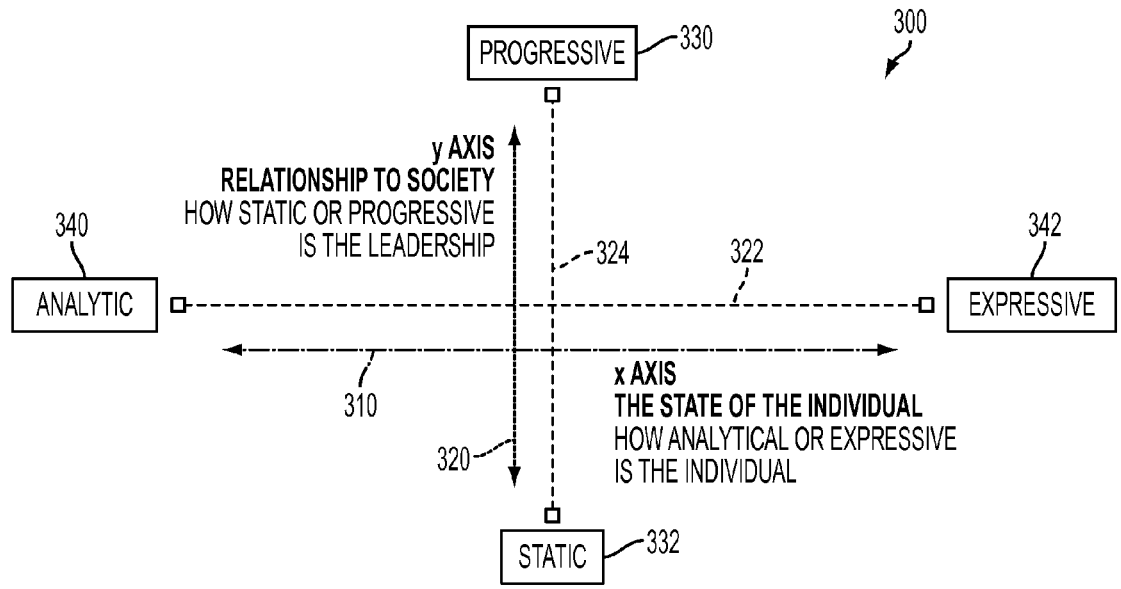
FIG. 3 is an alternate illustration of a grid or matrix for curating and visualizing data according to embodiments of the present disclosure.
Figure 4:
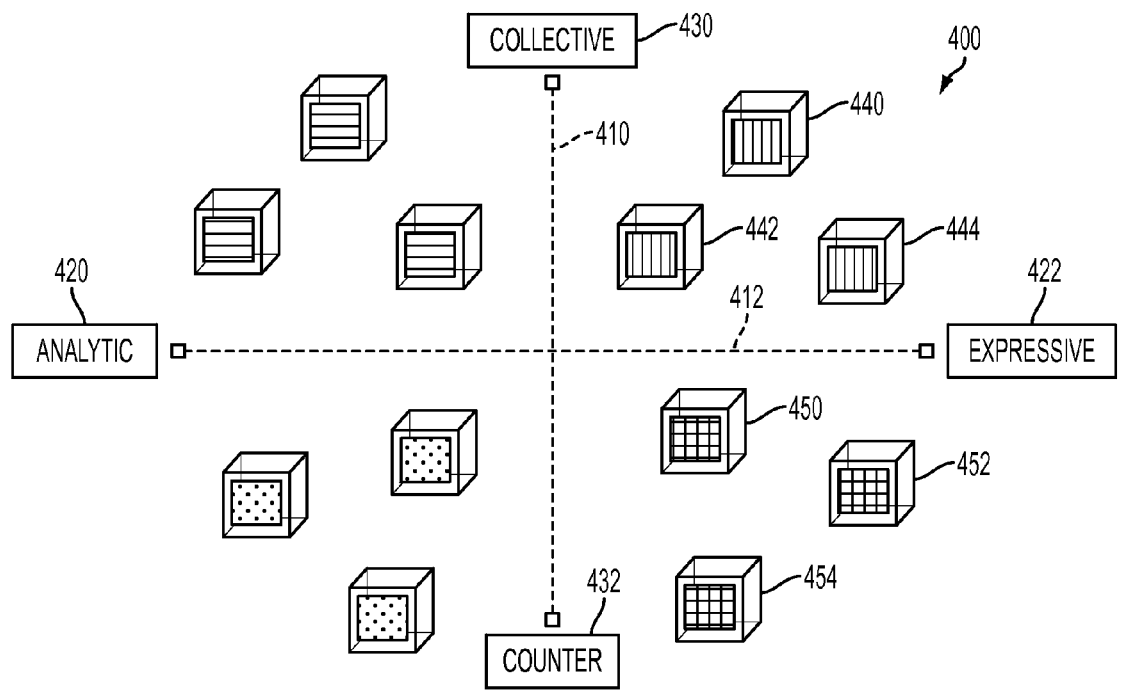
FIG. 4 is another illustration of an embodiment of a grid or matrix for curating and visualizing data according to the present disclosure.

FIGS. 3 and 4 illustrate additional representative grids or matrices 300, 400 for categorizing data collected from one or more websites as previously described with reference to FIG. 1. Grid 300 includes x-axis 310 with continuum 322 ranging between analytic 340 and expressive 342 behavior, while y-axis 320 is used to plot data along a continuum 324 ranging between progressive 330 and static 332 behaviors. In this representative embodiment, the position of data points or sets along the y-axis 320 characterizes the users relative relationship to society, i.e. how static or progressive is the leadership. The position of data points or sets along the x-axis 310 characterizes the state of the individual, i.e. how analytical or expressive is the individual. Similarly, as shown in FIG. 4, grid 400 is used to characterize behaviors of groups or mobs 440, 442, 444 and 450, 452, 454 along the y-axis 410 between collective 430 or counter 432, and along the x-axis 412 between analytic 420 or expressive 422. The groups or mobs may represent various subcultures within a particular quadrant.

Figure 5:
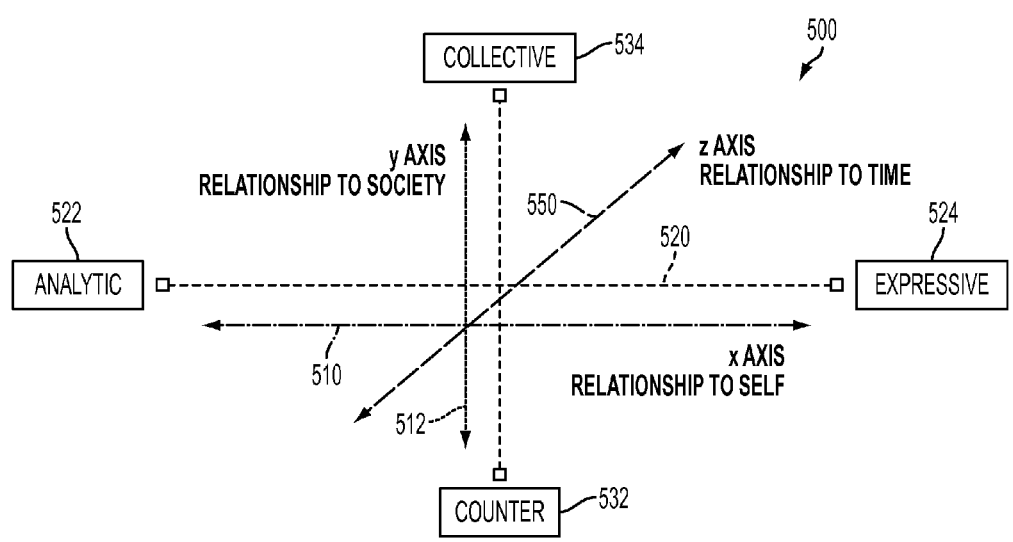
FIG. 5 illustrates a three-dimensional grid or matrix for curating and visualizing data according to embodiments of the present disclosure.

FIG. 5 illustrates a three-dimensional grid or matrix for curating and visualizing data according to embodiments of the present disclosure. Grid or matrix 500 may be used to plot data points or sets along x-axis 510 to characterize behavior based on a relationship to self that ranges between analytic 522 and expressive 524, and along y-axis 512 to characterize behavior based on a relationship to society that ranges from counter 532 to collective 534. Data may be monitored over time and plotted along z-axis 550 to illustrate the migration of the data or the relationship to time.

Figure 6:
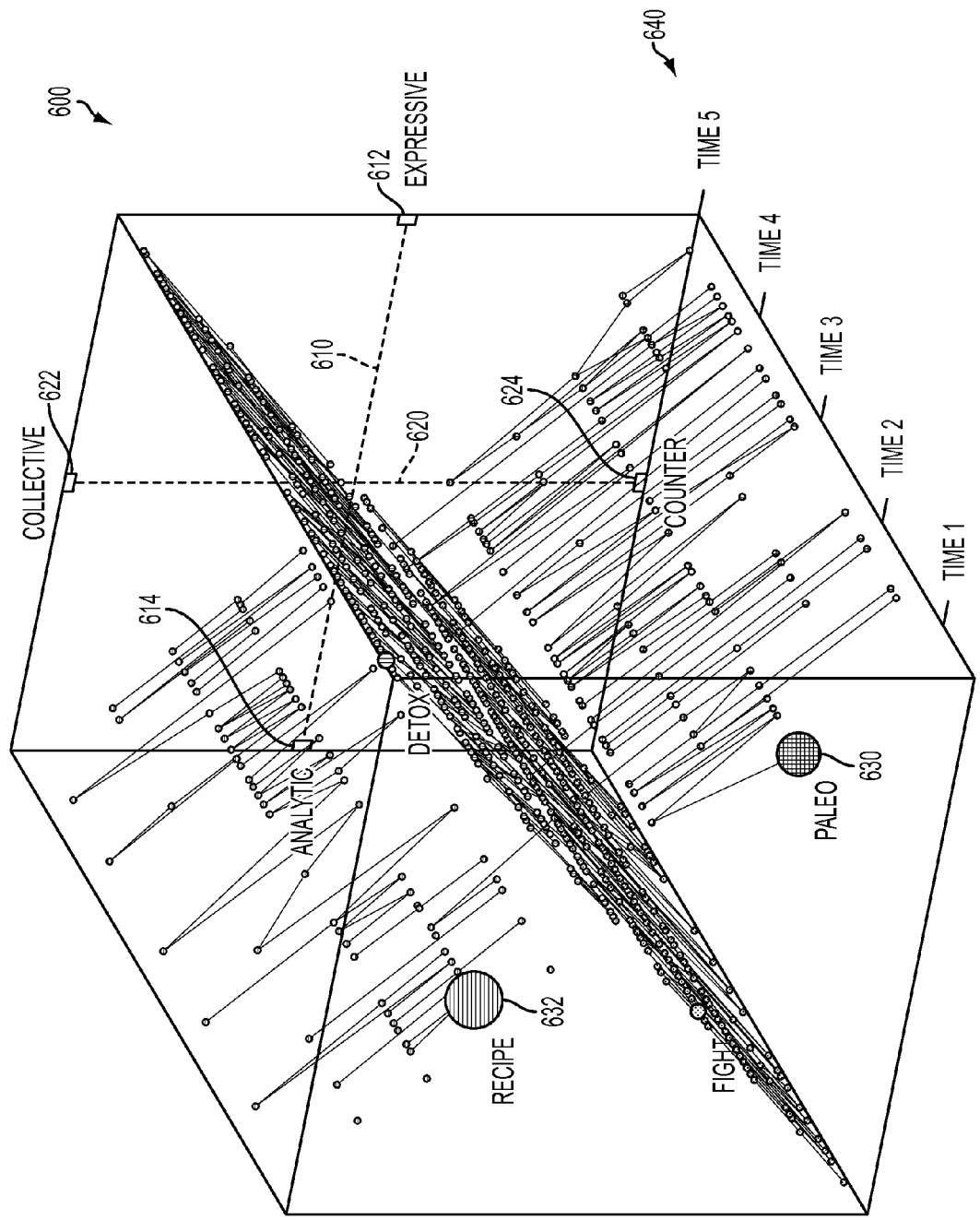
FIG. 6 illustrates data populating a three-dimensional grid or matrix in a system or method for culture mapping and intelligence according to one embodiment of the present disclosure.

FIG. 6 illustrates data populating a three-dimensional grid or matrix in a system or method for culture mapping and intelligence according to one embodiment of the present disclosure. Three-dimensional matrix 600 plots data points and sets, such as data set 630 and data set 632, in a similar grid or matrix having x-axis 610 with behaviors ranging from expressive 612 to analytic 614 and y-axis 620 with behaviors ranging from collective 622 to counter 624, at a plurality of times 640 as plotted along the z-axis.

Figure 7:
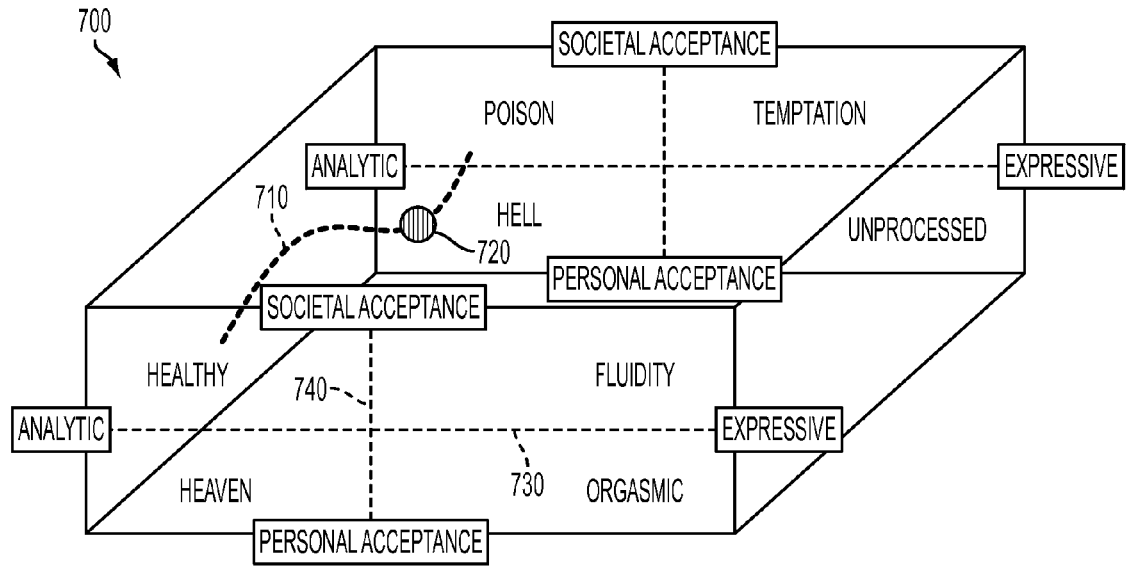
FIG. 7 is an alternative representation of a three-dimensional visualization for data used in a system or method for culture mapping and intelligence according to embodiments of the present disclosure.

FIG. 7 is an alternative representation of a three-dimensional quadrant chart visualization for data used in a system or method for culture mapping and intelligence according to embodiments of the present disclosure. Matrix 700 illustrates movement of a data point or data set 720 over time as represented by trace line 710. In this representative embodiment, each of four sentiments having corresponding trace lines that illustrate the progress or migration across time from the back to the front. The x-axis 730 shows the Analytic/Expressive spectrum, which is represented by a value between −5 and 5 in this embodiment. The y-axis 740 shows the Personal/Societal Acceptance spectrum, which is represented by a value between −5 and 5 in this embodiment. The z-axis shows the progress or migration of each trace line across time. A sphere 720 is shown on each trace line with the location of the sphere representing the current time slice being displayed. Each sphere may be annotated with a keyword for an associated time slice and the size of each sphere will represent the number of times the corresponding keyword is used for that time slice. A slider or similar control may be used by the user to move forward and backward in time with the spheres 720 moving along respective trace lines.

Figure 8:
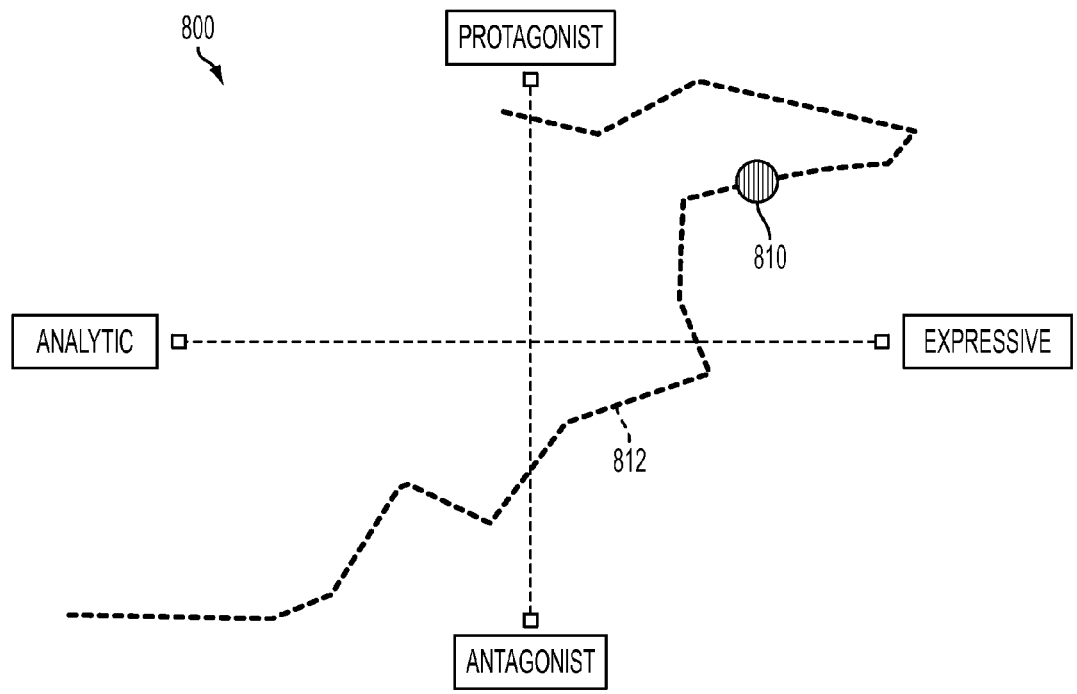
FIG. 8 is a two-dimensional graph illustrating migration of data over time in a system or method for culture mapping and intelligence according to embodiments of the present disclosure.

FIG. 8 is a two-dimensional graph illustrating migration of data over time in a system or method for culture mapping and intelligence according to embodiments of the present disclosure. For each of the monitored keywords, a respective trace line 812 illustrates migration or movement of the behavior line represented by data set 810, for example, across time based on available data. Position of circle 810 represents the current time slice being displayed and the size of each circle 810 represents the weighted score of the corresponding keyword at a corresponding time slice. A slider or similar control may be provided to move forward or backward in time.

Figure 9:
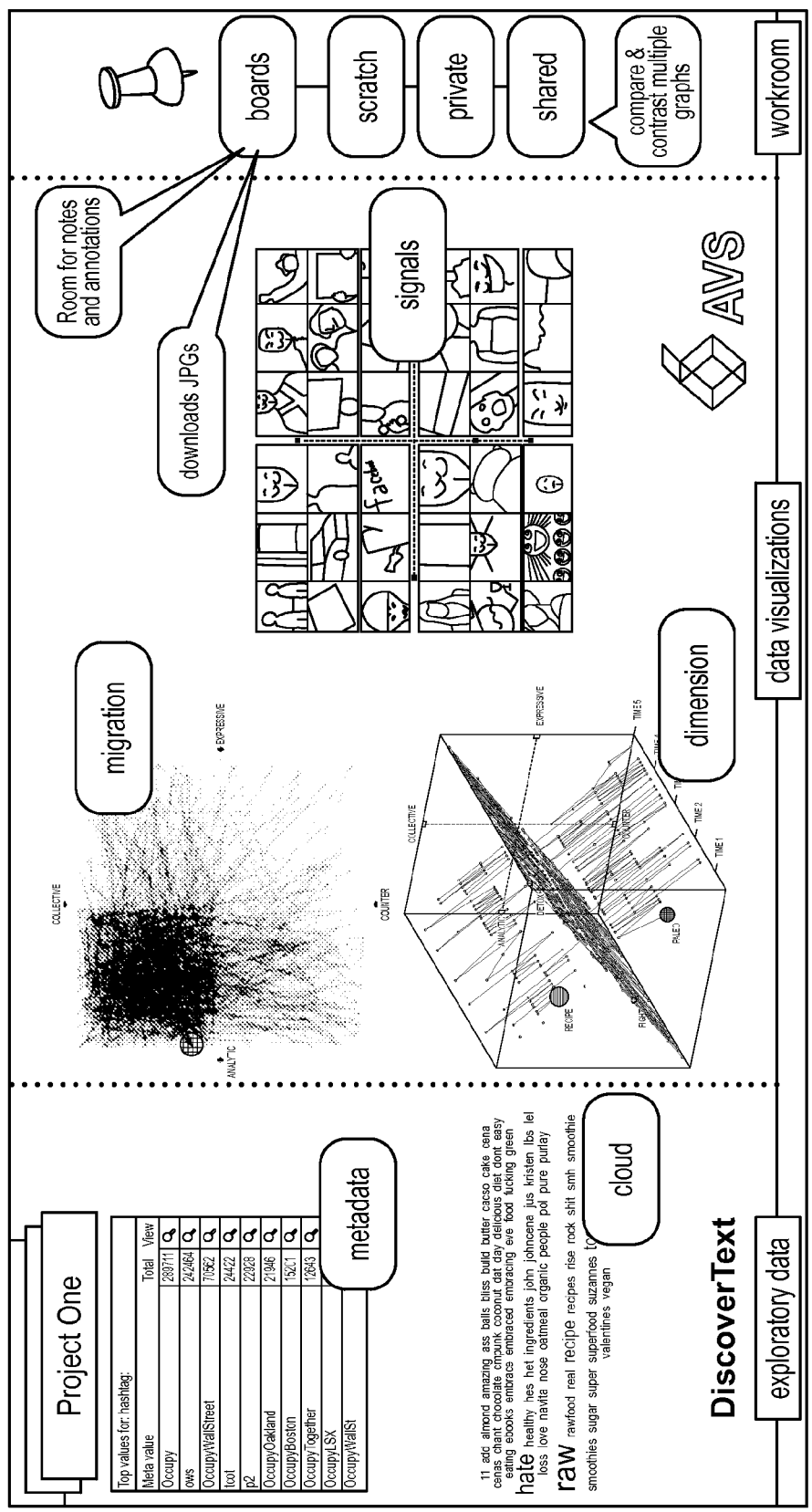
FIG. 9 illustrates features and functions of a dashboard application of one embodiment of a system or method for culture mapping and intelligence according to the present disclosure.

FIG. 9 is an alternative representation of representative features and functions of a dashboard application of one embodiment of a system or method for culture mapping and intelligence according to the present disclosure. As previously described with reference to FIG. 1, a dashboard application may include components or modules to identify various user accounts on websites on the internet related to a specified topic as determined by a search query. The corresponding APIs may be used to collect profile data for users so that behavior may be plotted in a two-dimensional matrix and monitored over time to illustrate migration of a particular user among the quadrants and associated behavioral archetypes of the matrix.

The representative user interface includes display areas for exploratory data, data visualizations, and a workroom. The exploratory data may include raw data collected and stored in the cloud, i.e. on a remote server accessible via the internet. The exploratory data may also include metadata associated with particular social media. In the representative embodiment and project illustrated in FIG. 9, metadata may include hashtags related to the "occupy" movement.

The user interface may cooperate with data processing algorithms executed by the same device hosting the user interface. Alternatively, the user interface may be executed by a mobile device in communication with one or more back-end data programs that generate the various data visualizations and provide associate results for display on the user interface. Available data visualizations may vary by application and implementation. In the representative embodiment illustrated, data visualizations may be used to illustrate migration of a particular theme in a two-dimensional representation or a three-dimensional representation. Data visualizations may also include pictures, images, emoticons, emoji, pictographs, or similar signals associated with a particular query topic or theme.

The representative user interface or dashboard illustrated in FIG. 9 also includes a workroom portion having a bulletin board or posting board to provide space for notes and annotations related to a particular project, which may include images in various formats, such as JPG, for example. The workroom may include a scratch pad area or function to track unused queries, user accounts. Similarly a private and shared area or function may be provided with the private area restricted for use and viewing by authorized users and the shared area used to compare and contrast multiple graphs with other projects or users, for example.

Figure 10:
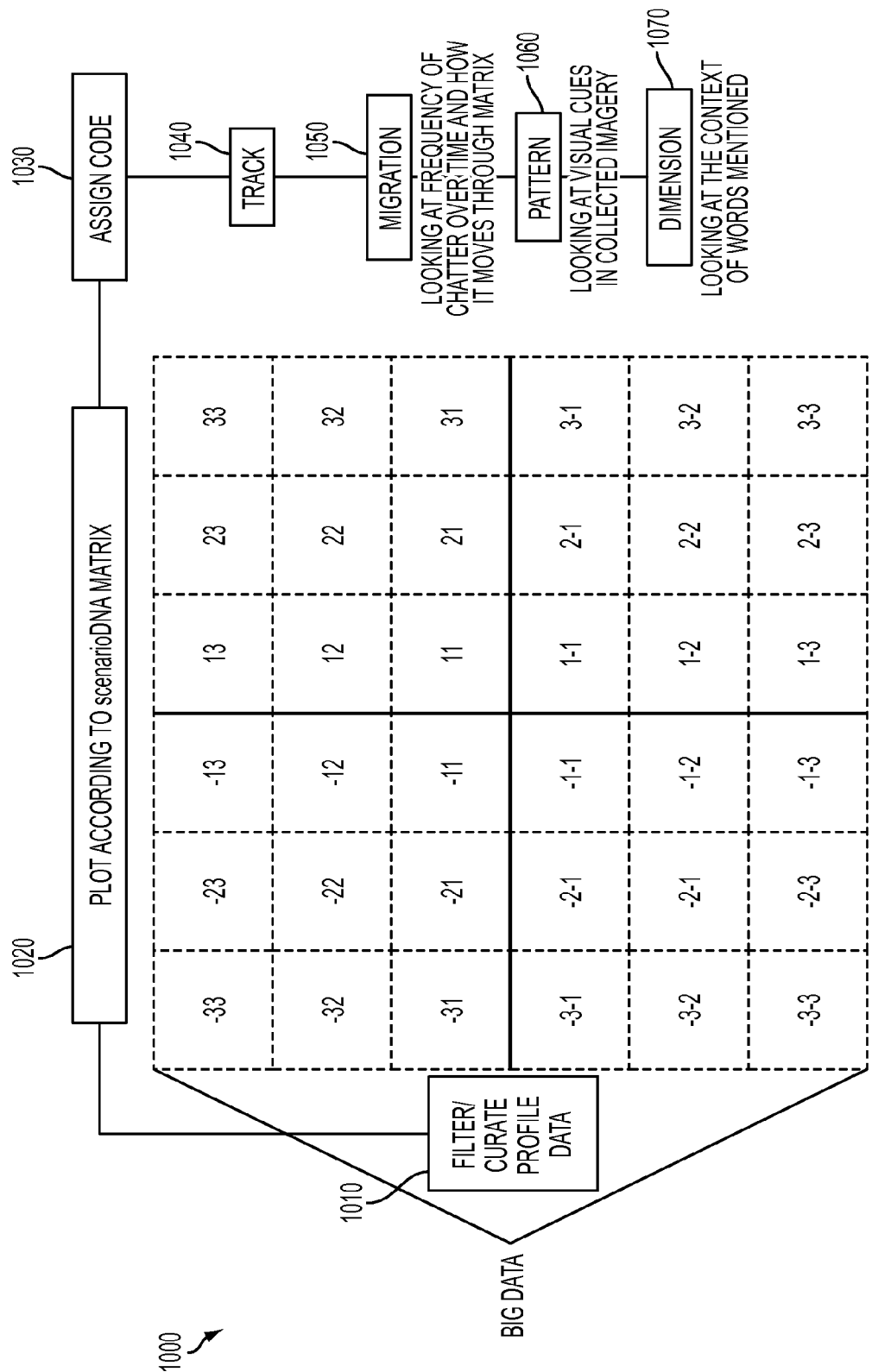
FIG. 10 is a block diagram illustrating operation of a system or method for culture mapping and intelligence according to embodiments of the present disclosure.

FIG. 10 is a block diagram illustrating operation of a system or method for culture mapping and intelligence according to embodiments of the present disclosure. One or more websites, which may include social networking websites, are identified along with associated user accounts based on unstructured words to generate data 1000. Associated user account profile data may be obtained and used to filter/curate the profile data as represented by block 1010. The data points and/or sets representing mobs or subcultures are plotted in a matrix as represented at 1020. The data may be used to identify or associate one or more codes 1030 corresponding to a particular behavior. The user accounts and use of the identified words may be tracked over time as represented at 1040 to illustrate migrations 1050, patterns 1060, and dimensions 1070. Migration 1050 of particular data points or sets may represent the frequency of use or chatter over a period of time and how the position within the matrix changes. Patterns 1060 may associate visual imagery with the particular mobs or groups. Dimensions 1070 may be explored based on the context of a particular word.

Figure 11:
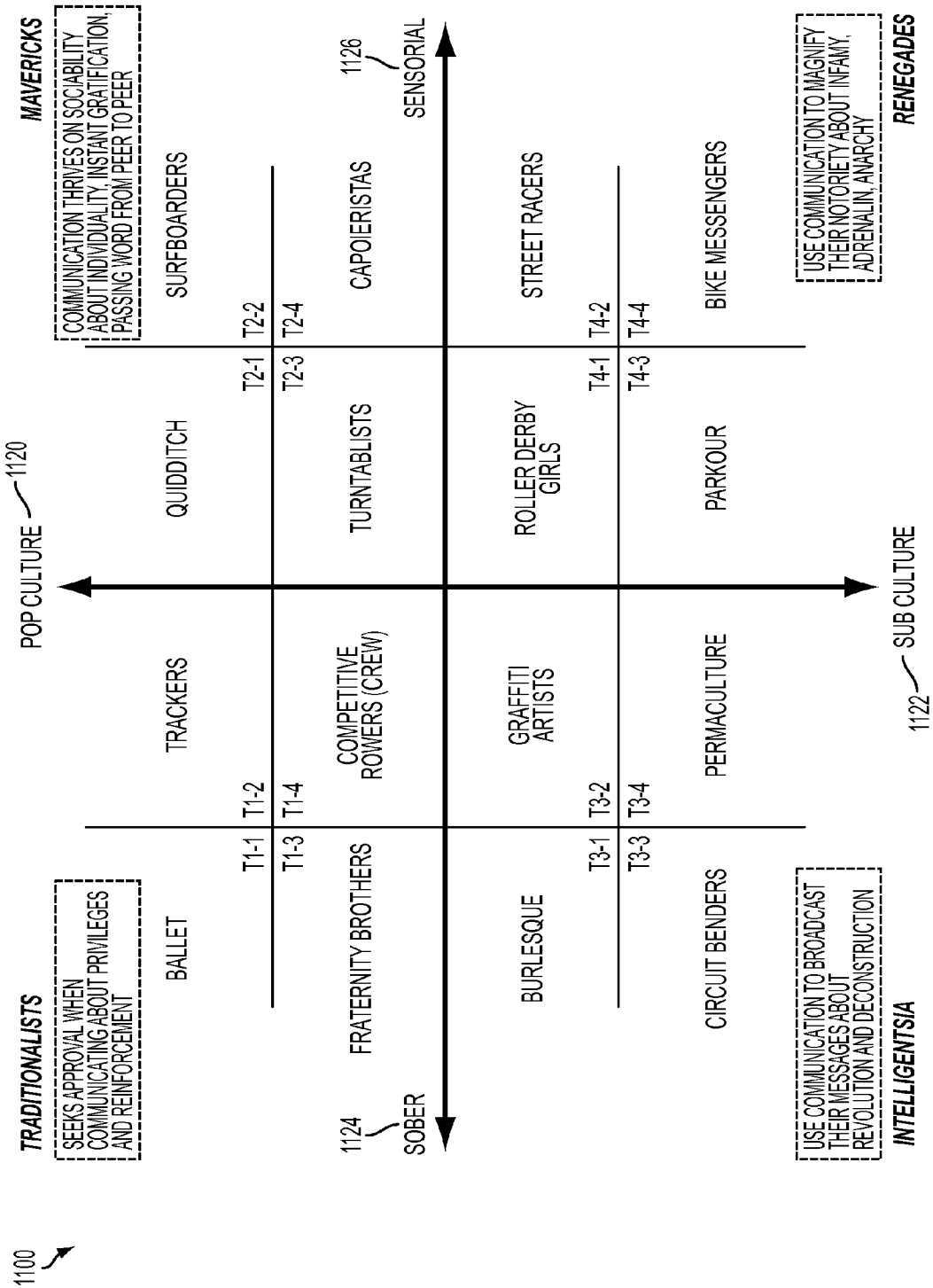
FIG. 11 is a grid or matrix illustrating data categorization by behavior archetype according to one embodiment of the present disclosure.

FIGS. 11-13 illustrate operation of a representative embodiment of a system or method for culture mapping and intelligence of communication. FIG. 11 is a grid or matrix illustrating data categorization by behavior archetype as generally characterized by quadrant as traditionalists, mavericks, intelligentsia, and renegades. Traditionalists are those that seek approval when communicating about privilege and reinforcement. For mavericks, communication thrives on sociability about individuality, instant gratification, and passing word from peer to peer. Intelligentsia use communication to broadcast their messages about revolution and deconstruction. Renegades use communication to magnify their notoriety about infamy, adrenalin, and anarchy.

FIG. 12 is a table with representative URLs used to curate data and populate four of the matrix cells in the embodiment of FIG. 11. FIG. 13 is a table illustrating user accounts associated with the URLs of FIG. 12 containing the unstructured data used in populating three of the matrix cells in the embodiment of FIG. 11. In the embodiment illustrated in FIGS. 11-13, matrix 1100 categorizes behavior archetypes along an x-axis continuum ranging from sober 1124 to sensorial 1126 and a y-axis continuum ranging from pop culture 1120 to subculture 1122. Subgroups or mobs are further categorized within each quadrant.

FIGS. 14-16 illustrate representative XML user profile data returned from representative websites in response to a query in a system or method for culture mapping and intelligence according to embodiments of the present disclosure.

With reference to FIGS. 1-16, in operation, a representative embodiment of a system or method for culture mapping and intelligence may be used in an exemplary application where a new client wants to understand which subgroups of pig farmers are likely to be fans of a new pig food, as well as how these subgroups may differ in characteristic behavior. The user of the system 100 (FIG. 1) provides a few hundred examples of the type of accounts from websites 130, 140, 150 exemplary of these subgroups. The user forms a query using input module 162 of dashboard 160. For example, the query may include a word, a combination of words, or a set of words for a particular field (like the byline, or in tweets, for example). The system 100 then produces a list of all accounts ordered by the frequency in which those words appear. The user then goes through each account on the list (which can each be individually brought up in its entirety in a popup, for preview) and assigns a weight before submitting the list to the system. Each account can accumulate multiple weights from multiple queries, which are averaged at the final processing. A grid (200, 300, 400) is produced with each account plotted according to its weight to allow for an overview, i.e., the user selects "whole grain" and "tweets" and gets a list of 324 accounts, ordered from 1 occurrence of the words "whole grain" in a tweet, to 775 occurrences. The user then assigns weights to selected accounts and may repeat for as many queries as desired. When all queries are submitted, the system produces a set of accounts with varied weights (each of which is the average from all its queries) which all get plotted on a grid (200, 300, 400). The accounts may be monitored over a number of days, weeks, or months with time slices plotted as described with reference to FIGS. 6-8, for example.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, life cycle cost, marketability, appearance, packaging, size, serviceability, ease of use, etc. The embodiments discussed herein that are described as less desirable than other embodiments or prior art implementations with respect to one or more characteristics are not outside the scope of the disclosure and may be desirable for particular applications.

What is claimed:

1. A method implemented by a computer for culture mapping and intelligence, comprising:
   selecting, by the computer, at least one data source containing unstructured words and phrases from a plurality of networked computers in response to a user query relative to a topic of interest;
   electronically receiving data using the computer from the data source via a computer network;
   generating a list of monitored user accounts using the computer based on one or more selected criteria;
   querying the data source to identify user account profile data, wherein the profile data comprises unstructured data containing words and phrases from the monitored user accounts;
   processing the unstructured profile data and performing semiotic analysis of the words and phrases to associate a behavior archetype based on the profile data; and
   mapping the user account to a grid relative to first and second behavior continuums of behavior archetypes representing a relationship of user to self along a first axis and a relationship of user to society along a second axis based on the semiotic analysis of the words and phrases.

2. The method of claim 1 further comprising applying at least one weighting factor to the monitored user accounts.

3. The method of claim 2 further comprising:
   applying at least two weighting factors to at least one of the monitored user accounts; and
   combining the at least two weighting factors to generate a single weighting factor for each monitored user account.

4. The method of claim 1 further comprising:
   tracking occurrence of the topic of interest within respective monitored user accounts over a period of time; and
   displaying migration of the user account relative to the grid along the first and second behavior continuums of behavior archetypes.

5. The method of claim 1 wherein the at least one data source comprises a remotely located server hosting a social networking website and communicating with the computer over the internet.

6. The method of claim 1 wherein querying the data source comprises:
generating a query using the computer to prompt for a word, a combination of words, or a set of words for a particular field associated with the profile data.

7. The method of claim 1 wherein displaying the user account comprises generating a three dimensional representation including first and second axes associated with the first and second behavior continuums, respectively, and a third axis associated with time.

8. A system for culture mapping and intelligence, comprising
a computer having a microprocessor in communication with a selected data source for receiving data including unstructured words and phrases collected from a plurality of user account profiles associated with at least one networked computer, generating a list of monitored user accounts based on a user query relative to a topic of interest, and processing the unstructured words and phrases data collected from the monitored user accounts using semiotic analysis to associate a behavior archetype based on the user account profiles; and
a display in communication with the computer that maps the user account on a cultural segmentation map relative to first and second behavior continuums based on a relationship of user to self and a relationship of user to society.

9. The system of claim 8 wherein the selected data source comprises a server in communication with the computer over the internet, the server hosting a social networking website.

10. The system of claim 8 wherein the computer is configured to generate a user interface on the display having display areas associated with exploratory data collected from the plurality of user account profiles, and data visualizations representing user accounts relative to the behavior archetype.

11. The system of claim 8 wherein the computer comprises a hand-held mobile device.

12. The system of claim 8 further comprising a hand-held mobile device having a microprocessor configured to generate a user interface with prompts to construct the user query relative to the topic of interest, the hand-held mobile device being in communication with the computer.

13. The system of claim 8 wherein the computer is configured to:
track occurrence of the topic of interest within respective monitored user accounts over a period of time; and
display migration of the user account over the period of time relative to the grid along the first and second behavior continuums.

14. The system of claim 8 wherein the computer is configured to:
applying at least two weighting factors to at least one of the monitored user accounts; and
combine the at least two weighting factors to generate a single weighting factor for each monitored user account.

15. A system for culture mapping and visualization, comprising:
a computer configured to display a user interface to prompt a user to enter a user query relative to a topic of interest, select at least one data source containing unstructured data including words and phrases from a plurality of computers communicating over the internet, electronically receive data from the at least one data source, generate a list of monitored user accounts residing on the at least one data source, querying the data source to identify user account profile data comprising unstructured user data including words and phrases, processing the profile data to map the user account relative to a behavior archetype based on the profile data, and generate a data visualization of the user account relative to first and second behavior continuums of behavior archetypes, the data visualization including a first axis representing a relationship of user to self and a second axis representing a relationship of user to society.

16. The system of claim 15 wherein the computer is further configured to apply at least one weighting factor to the monitored user accounts.

17. The system of claim 15 wherein the computer is configured to:
track occurrences of the topic of interest within respective monitored user accounts over a period of time; and
generate a visualization of the user account relative to the first and second behavior continuums of behavior archetypes over the period of time.

18. The system of claim 17 wherein the visualization comprises a two-dimensional graph.

* * * * *

UNITED STATES PATENT AND TRADEMARK OFFICE
CERTIFICATE OF CORRECTION

Page 1 of 1

PATENT NO. : 9,002,755 B2
APPLICATION NO. : 14/173379
DATED : April 7, 2015
INVENTOR(S) : Timothy J. Stock et al.

It is certified that error appears in the above-identified patent and that said Letters Patent is hereby corrected as shown below:

In the Claims

Column 12, Line 10, Claim 14:

Before "at least two weighting factors"
Delete "applying" and
Insert -- apply --.

Signed and Sealed this
First Day of September, 2015

Michelle K. Lee
*Director of the United States Patent and Trademark Office*